(12) United States Patent
Pettinati et al.

(10) Patent No.: US 7,802,191 B2
(45) Date of Patent: *Sep. 21, 2010

(54) CONTACT PICKER INTERFACE

(75) Inventors: Fabio Pettinati, Redmond, WA (US); John-Anthony Owens, Seattle, WA (US); Jonathan D. Perlow, Seattle, WA (US); Cornelis K. van Dok, Bellevue, WA (US); Denise L. Chen, Bellevue, WA (US); Marc A. Silbey, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 233 days.

This patent is subject to a terminal disclaimer.

(21) Appl. No.: 12/195,214

(22) Filed: Aug. 20, 2008

(65) Prior Publication Data

US 2008/0307306 A1 Dec. 11, 2008

Related U.S. Application Data

(63) Continuation of application No. 10/845,464, filed on May 13, 2004, now Pat. No. 7,418,663, which is a continuation-in-part of application No. 10/324,746, filed on Dec. 19, 2002, now Pat. No. 7,313,760.

(51) Int. Cl.
*G06F 3/00* (2006.01)
*G06F 7/00* (2006.01)
*G06F 17/00* (2006.01)

(52) U.S. Cl. ............... 715/739; 715/738; 715/968; 707/6

(58) Field of Classification Search .............. 715/739, 715/968; 707/6
See application file for complete search history.

(56) References Cited

U.S. PATENT DOCUMENTS 5,214,756 A 5/1993 Franklin
5,640,565 A 6/1997 Dickinson (Continued)

FOREIGN PATENT DOCUMENTS

JP 9-046335 2/1997

(Continued)

OTHER PUBLICATIONS

Office Action dated Mar. 30, 2010 cited in U.S. Appl. No. 11/760,392.

(Continued)

*Primary Examiner*—William L Bashore
*Assistant Examiner*—David Phantana-angkool
(74) *Attorney, Agent, or Firm*—Workman Nydegger

(57) ABSTRACT

An interface for enabling a user to quickly access contact information automatically displays a list of expected contacts that are most likely to be selected by the user when attention is directed to an appropriate object requiring contact information. When a contact is selected, the corresponding and appropriate contact information is automatically entered. If a user does not select a listed contact, but instead begins manually typing in the contact information then the interface performs a search and displays a list of unexpected contacts having contact information matching the typed input from the user. Various criteria can be used to identify which contacts will be presented to the user and how they will be presented.

17 Claims, 6 Drawing Sheets

U.S. PATENT DOCUMENTS

| | | |
|---|---|---|
| 5,659,788 A | 8/1997 | Someya |
| 5,737,726 A | 4/1998 | Cameron |
| 5,767,897 A | 6/1998 | Howell |
| 5,870,744 A | 2/1999 | Sprague |
| 5,873,108 A | 2/1999 | Goyal |
| 5,896,321 A | 4/1999 | Miller |
| 5,913,032 A | 6/1999 | Schwartz |
| 5,923,848 A | 7/1999 | Goodhand |
| 5,950,193 A | 9/1999 | Kulkarni |
| 5,959,629 A | 9/1999 | Masui |
| 5,999,208 A | 12/1999 | McNerney |
| 6,008,799 A | 12/1999 | Van Kleeck |
| 6,014,135 A | 1/2000 | Fernandes |
| 6,026,396 A | 2/2000 | Hall |
| 6,065,012 A | 5/2000 | Balsara |
| 6,208,339 B1 | 3/2001 | Atlas |
| 6,209,005 B1 | 3/2001 | Harker |
| 6,212,534 B1 | 4/2001 | Lo |
| 6,216,122 B1 | 4/2001 | Elson |
| 6,247,043 B1 | 6/2001 | Bates |
| 6,269,369 B1 | 7/2001 | Robertson |
| 6,339,826 B2 | 1/2002 | Hayes |
| 6,411,961 B1 | 6/2002 | Chen |
| 6,434,564 B2 | 8/2002 | Ebert |
| 6,460,074 B1 | 10/2002 | Fishkin |
| 6,539,379 B1 | 3/2003 | Vora |
| 6,557,004 B1 | 4/2003 | Ben-Schachar |
| 6,564,213 B1 | 5/2003 | Ortega |
| 6,564,327 B1 | 5/2003 | Klensin |
| 6,571,235 B1 | 5/2003 | Marpe |
| 6,581,059 B1 | 6/2003 | Barrett |
| 6,581,062 B1 | 6/2003 | Draper |
| 6,609,108 B1 | 8/2003 | Pulliam |
| 6,643,661 B2 | 11/2003 | Polizzi |
| 6,661,434 B1 | 12/2003 | MacPahil |
| 6,668,281 B1 | 12/2003 | Ayyadurai |
| 6,678,685 B2 | 1/2004 | McGill |
| 6,699,125 B2 | 3/2004 | Kirmse |
| 6,701,348 B2 | 3/2004 | Sommerer |
| 6,718,366 B2 | 4/2004 | Beck |
| 6,753,889 B1 | 6/2004 | Najmi |
| 6,781,608 B1 | 8/2004 | Crawford |
| 6,791,583 B2 | 9/2004 | Tang |
| 6,820,075 B2 | 11/2004 | Shanahan |
| 6,820,204 B1 | 11/2004 | Desai |
| 6,828,988 B2 | 12/2004 | Hudson |
| 6,829,607 B1 | 12/2004 | Tafoya |
| 6,832,263 B2 | 12/2004 | Polizzi |
| 6,839,680 B1 | 1/2005 | Liu |
| 6,845,370 B2 | 1/2005 | Burkey |
| 6,859,823 B1 | 2/2005 | Nishihara |
| 6,870,921 B1 | 3/2005 | Elsey |
| 6,871,140 B1 | 3/2005 | Florance |
| 6,883,000 B1 | 4/2005 | Gropper |
| 6,895,388 B1 | 5/2005 | Smith |
| 6,907,580 B2 | 6/2005 | Michelman |
| 6,947,929 B2 | 9/2005 | Bruce |
| 6,959,340 B1 | 10/2005 | Najmi |
| 6,983,310 B2 | 1/2006 | Rouse |
| 6,985,924 B2 | 1/2006 | Schwartz |
| 6,988,128 B1 | 1/2006 | Alexander |
| 6,990,495 B1 | 1/2006 | Grason |
| 6,993,712 B2 | 1/2006 | Ramachandran |
| 7,007,149 B2 | 2/2006 | Chung |
| 7,010,572 B1 | 3/2006 | Benjamin |
| 7,010,599 B2 | 3/2006 | Shrinivasan |
| 7,010,616 B2 | 3/2006 | Carlson |
| 7,043,471 B2 | 5/2006 | Cheung |
| 7,068,768 B2 | 6/2006 | Barnes |
| 7,076,498 B2 | 7/2006 | Banerjee |
| 7,096,232 B2 | 8/2006 | Doss |
| 7,113,941 B2 | 9/2006 | Arend |
| 7,117,271 B2 | 10/2006 | Haverstock |
| 7,130,853 B2 | 10/2006 | Roller |
| 7,139,774 B2 | 11/2006 | Dettinger |
| 7,143,190 B2 | 11/2006 | Christensen |
| 7,146,570 B2 | 12/2006 | Yeh |
| 7,149,731 B2 | 12/2006 | Dettinger |
| 7,159,207 B2 | 1/2007 | Tang |
| 7,162,474 B1 | 1/2007 | Harker |
| 7,185,271 B2 | 2/2007 | Lee |
| 7,185,290 B2 | 2/2007 | Cadiz |
| 7,191,210 B2 | 3/2007 | Grossman |
| 7,209,951 B2 | 4/2007 | Goldberg |
| 7,240,298 B2 | 7/2007 | Grossman |
| 7,287,053 B2 | 10/2007 | Bodin |
| 7,302,634 B2 | 11/2007 | Lucovsky |
| 7,360,172 B2 | 4/2008 | Grossman |
| 7,360,174 B2 | 4/2008 | Grossman |
| 7,370,290 B2 | 5/2008 | Grossman |
| 7,418,663 B2 * | 8/2008 | Pettinati et al. ............. 715/739 |
| 2002/0029254 A1 | 3/2002 | Davis |
| 2002/0073207 A1 | 6/2002 | Widger |
| 2002/0107914 A1 | 8/2002 | Charisus |
| 2002/0120864 A1 | 8/2002 | Wu |
| 2002/0143961 A1 | 10/2002 | Siegel |
| 2002/0156895 A1 | 10/2002 | Brown |
| 2002/0186257 A1 | 12/2002 | Cadiz |
| 2003/0041065 A1 | 2/2003 | Lucovsky |
| 2003/0041076 A1 | 2/2003 | Lucovsky |
| 2003/0050911 A1 | 3/2003 | Lucovsky |
| 2003/0069874 A1 | 4/2003 | Hertzog |
| 2003/0126137 A1 | 7/2003 | McFadden |
| 2003/0158855 A1 | 8/2003 | Farnham |
| 2003/0208465 A1 | 11/2003 | Yurko |
| 2003/0210265 A1 | 11/2003 | Haimberg |
| 2004/0083453 A1 | 4/2004 | Knight |
| 2004/0093334 A1 | 5/2004 | Scherer |
| 2004/0103364 A1 | 5/2004 | Dornback |
| 2004/0107283 A1 | 6/2004 | Paddon |
| 2004/0117322 A1 | 6/2004 | Bjorksten |
| 2004/0122822 A1 | 6/2004 | Thompson |
| 2004/0139025 A1 | 7/2004 | Coleman |
| 2004/0177082 A1 | 9/2004 | Nitta |
| 2004/0199581 A1 | 10/2004 | Kucharewski |
| 2004/0210844 A1 * | 10/2004 | Pettinati et al. ............. 715/708 |
| 2004/0221309 A1 | 11/2004 | Zaner |
| 2004/0235520 A1 | 11/2004 | Cadiz |
| 2004/0236792 A1 | 11/2004 | Celik |
| 2004/0243935 A1 | 12/2004 | Abramovitch |
| 2004/0260948 A1 | 12/2004 | Miyata |
| 2005/0002510 A1 | 1/2005 | Elsey |
| 2005/0004874 A1 | 1/2005 | Gilmour |
| 2005/0015439 A1 | 1/2005 | Balaji |
| 2005/0080805 A1 | 4/2005 | Haeberle |
| 2005/0091072 A1 | 4/2005 | Dunn |
| 2005/0114329 A1 | 5/2005 | Dettinger |
| 2005/0131888 A1 | 6/2005 | Tafoya |
| 2005/0182741 A1 | 8/2005 | Grossman |
| 2005/0262208 A1 | 11/2005 | Haviv |
| 2005/0283468 A1 | 12/2005 | Karnvar |
| 2006/0010104 A1 | 1/2006 | Pettinati |
| 2006/0041545 A1 | 2/2006 | Heidloff |
| 2006/0053384 A1 | 3/2006 | La Fetra |
| 2006/0064645 A1 | 3/2006 | Neven |
| 2006/0174002 A1 | 8/2006 | Shrinivasan |
| 2006/0253787 A1 | 11/2006 | Fogg |
| 2006/0277213 A1 | 12/2006 | Robertson |
| 2007/0240081 A1 | 10/2007 | Grossman |

FOREIGN PATENT DOCUMENTS

| | | |
|---|---|---|
| JP | 9-503088 | 3/1997 |
| JP | 2000-315234 | 11/2000 |

| | | |
|---|---|---|
| JP | 2002-517863 | 6/2002 |
| JP | 2002-312404 | 10/2002 |
| WO | 95/23371 | 8/1995 |
| WO | WO 95/23371 | 8/1995 |
| WO | 99/64970 | 12/1999 |
| WO | WO 99/64970 | 12/1999 |
| WO | WO 01-80190 | 1/2001 |
| WO | 2073454 | 9/2002 |
| WO | 2005013079 | 10/2005 |

OTHER PUBLICATIONS

Anderson, T., Change Your Outlook, Developer Network Journal, No. 25, p. 50-1, Jul.-Aug. 2001.

Taylor, T.C., Databases Save Time And Customers, Sales & Marketing Management, vol. 142, No. 4, p. 105-7, Mar. 1990.

Kubota, K.; Masuno, H., Multi-Media Software PI, NEC Technical Journal, vol. 41, No. 13, p. 72-6, Nov. 1988.

Pettigrew, T., ACT!—Automated Contact Tracking, CA Magazine, vol. 95, No. 1022, p. 48-9, Sep. 1991.

Simaioforidis, A.; Karlgren, J,; Ereback, A., Research and Advanced Technology for Digital Libraries, Second European Conference, ECDL '98. Proceedings, p. 673-4, Sep. 21-23, 1998.

Heller, S.R., Symantec ACT! 4.0 for Windows, Journal of Chemical Information and Computer Sciences, vol. 38, No. 4, p. 772, Jul.-Aug. 1998.

Padwick, Feddema, Special Edition Using Microsoft Outlook 2000, Que, Ch. 9 'Managing Contacts', p. 1-17.

Padwick, Feddema, Special Edition Using Microsoft Outlook 2000, Que, Ch. 16 'Managing Your Computer Environment': Using Other Shortcuts in the Outlook Bar, p. 1-4.

Padwick, Feddema, Special Edition Using Microsoft Outlook 2000, Que, Ch. 18 'Finding and Organizing Outlook Items': Using the QuickFind Contact Tool, p. 1-4.

Padwick, Feddema, Special Edition Using Microsoft Outlook 2000, Que, Ch. 18 'Finding and Organizing Outlook Items': Organizing Outlook Items, p. 1-7.

Padwick, Feddema, Speical Edition Using Microsoft Outlook 2000, Que, Ch. 22 'Creating and Using Rules', p. 1-5.

Padwick, Feddema, Special Edition Using Microsoft Outlook 2000, Que, Ch. 38 'Creating Views and Print Styles', p. 1-25.

Padwick, Feddema, Special Edition Using Microsoft Outlook 2000, Que, Ch. 41 'Creating and Using Custom Fields': Why Do You Need Custom Fields?, p. 1-14.

Padwick, Feddema, Special Edition Using Microsoft Outlook 2000, Que, Ch. 41 'Creating and Using Custom Fields': Creating a Simple Custom Field, p. 1-3.

Padwick, Feddema, Special Edition Using Microsoft Outlook 2000, Que, Appendix C 'Outlook's Files, Folders, Fields, and Registry Keys', p. 1.

Mohamed; "Marketcircle a recipient of the 2002 Apple Design Awards"; May 15, 2002; Marketcircle.

Hibbert, Chris, "Visual Flex and XML", downloaded from www.dataaccess.com/whitepapers/xml/XMLWP.htm, dated by Wayback Machine as: May 2, 2001, pp. 1-25.

Dogac, Asuman, et al., "An ebXML Infrastructure Implementation through UDDI Registries and RosettaNet PIPs", ACMSIGMOD 2002, Madison, WI, Jun. 4-6, 2002, pp. 512-523.

Ren, Ligang, et al., "Data Synchronization in the Mobile Internet", The 7th Intl Conf on CSCW in Design, Sep. 25-27, 2002, pp. 95-98.

Lee, Jinho, et al., "An Evaluation of the Incorporation of a Semantic Network Into a Multidimensional Retrieval Engine", CIKM '03 New Orleans, LA, Nov. 3-8, 2003, pp. 572-575.

Su, Hong, et al., "Automating the Transformation of XML Documents", WIDM 2001, Atlanta, GA, Nov. 2001, pp. 68-75.

McCabe, M. Catherine, et al., "On the Design and Evaluation of a Multi-Dimensional Approach to Information Retrieval", SIGIR 2000, Athens, Greece, Jul. 2000, pp. 363-365.

Bussler, Chrisoph, et al., "A Conceptual Architecture for Semantic Web Enabled Services", SIGMOD Record, vol. 31, No. 4, Dec. 2002, pp. 24-29.

Nejdl, Wolgang, et al., "EDUTELLA: A P2P Networking Infrastructure Based on RDF", WWW 2002, Honolulu, HI, May 7-11, 2002, pp. 604-615.

Bychkov, Yury, et al., "Interactive Migration of Legacy Databases to Net-Centric Technologies", Proceedings of the 8th Working Conference on Reverse Engineering, Oct. 2-5, 2001, pp. 328-334.

Bakker, John-Luc, et al., "Next Generation Service Creation Using XML Scripting Languages", IEEE International Conference on Communications, vol. 4, Apr. 22, May 2, 2001, pp. 2001-2007.

Kim, Sung Wan, et al., "Developing a Native Storage Structure for XML Repository System in Main Memory", 5th International Conference on High Speed Networks and Multimedia Communications, © 2002, pp. 96-100.

Shui, William M., et al., "Application of XML Schema and Active Rules System in Management and Integration of Heterogeneous Biological Data", BIBE '03, Mar. 10-12, 2003, pp. 367-374.

Banerjee, Sandeepan, et al., "Oracle8i—The XML Enabled Data Management System", 16th International Conference on Data Engineering, San Diego, CA Feb. 29-Mar. 3, 2000, pp. 561-568.

Haas, L.M., et al. "Transforming Heterogeneous Data with Database Middleware: Beyond Integration", Bulletin of the IEEE Computer Society Technical Committee on Data Engineering, © 1997, pp. 1-6.

Nambiar, Uilas, et al., "Current Approaches to XML Management", IEEE Internet Computing, vol. 6, Issue4, Jul./Aug. 2002, pp. 43-51.

Lear, Ann C., et al, "XML Seen as Integral to Application Integration", IT Professional, vol. 1, Issue 5, Sep./Oct. 1999, pp. 12-16.

Paul McFedries, Complete Idiot's Guide to Windows XP, Pub Date: Oct. 3, 2001. pp. 1-3.

Paul Thurrott's SuperSite for Windows: Internet Explorer 5.0 Reviewed. Duke Communications International, Inc. 2000. pp. 1-8.

By Gordon Padwick, Helen Feddma; ProQuest Information and Learning—"Special Edition Using Microsoft Outlook 2000"; Publisher; Que; Pub Date: May 12, 1999; "Safari Tech Books, Online".

Zhan, H. F., et al., "A Web-Based Collaborative Product Design Platform for Dispersed Network Manufacturing", Journal of Materials Processing, vol. 138, Isssues 1-3, Jul. 20, 2003, pp. 600-604.

Huynh, David, et al., "Haystack: A Platform for Creating, Organizing and Visualization Information Using RDF", Semantic Web Workshop (atWWW2002), Honolulu, HI, May 2002, pp. 1-11.

Getting Results with Microsoft Office 97, Microsoft Corp, Redmond, WA, © 1997, pp. 28-31, 345-374 and 470-471.

Padwick, Gordon et al., Special Edition Using Microsoft Outlook 2000, Que Corp., Indianapolis, IN, May 1999, pp. 370-376, 382-386 and 392-396.

Morrison, Michael et al., XML Unleashed, SAMS Corp., Indianapolis, IN, Dec. 1999, pp. 26-37, 84-104 and 106-122.

Office Action dated Jun. 6, 2006 cited in U.S. Appl. No. 10/324.746.

Office Action dated Feb. 26, 2007 cited in U.S. Appl. No. 10/324,746.

Notice of Allowance dated Jul. 3, 2007 cited in U.S. Appl. No. 10/327,746.

Notice of Allowance dated Sep. 7, 2007 cited in U.S. Appl. No. 10/327,746.

Office Action dated Apr. 6, 2007 cited in U.S. Appl. No. 10/845,464.

Office Action dated Aug. 23, 2007 cited in U.S. Appl. No. 10/845,464.

Office Action dated Jan. 28, 2008 cited in related U.S. Appl. No. 10/845,464.

Notice of Allowance dated May 19, 2008 cited in U.S. Appl. No. 10/845,464.

Office Action dated Jun. 5, 2007 cited in U.S. Appl. No. 10/885,974.

Office Action dated Oct. 5, 2007 cited in U.S. Appl. No. 10/885,974.

Notice of Allowance dated Jun. 13, 2008 cited in U.S. Appl. No. 10/885,974.

Office Action dated Jun. 22, 2007 cited in U.S. Appl. No. 10/692,257.

Office Action dated Nov. 16, 2007 cited in U.S. Appl. No. 10/692,257.

Office Action dated Apr. 7, 2008 cited in U.S. Appl. No. 10/692,257.

Office Action dated Apr. 5, 2006 cited in U.S. Appl. No. 10/324,250.

Office Action dated Sep. 22, 2006 cited in U.S. Appl. No. 10/324,250.

Office Action dated Feb. 7, 2007 cited in U.S. Appl. No. 10/324,250.

Notice of Allowance dated Aug. 9, 2007 cited in U.S. Appl. No. 10/324,250.

Notice of Allowance dated Oct. 2, 2007 cited in U.S. Appl. No. 10/324,250.
Notice of Allowance dated Nov. 16, 2007 cited in U.S. Appl. No. 10/324,250.
Office Action dated Apr. 14, 2006 cited in U.S. Appl. No. 10/324,251.
Office Action dated Nov. 3, 2006 cited in U.S. Appl. No. 10/324,251.
Notice of Allowance dated Mar. 27, 2007 cited in U.S. Appl. 10/324,251.
Office Action dated Jan. 22, 2007 cited in U.S. Appl. No. 10/324,243.
Office Action dated Aug. 3, 2007 cited in U.S. Appl. No. 10/324,243.
Office Action dated Mar. 24, 2008 cited in U.S. Appl. No. 10/324,243.
Office Action dated Apr. 3, 2006 cited in U.S. Appl. No. 10/324,246.
Office Action dated Oct. 31, 2006 cited in U.S. Appl. No. 10/324,246.
Office Action dated Mar. 21, 2007 cited in U.S. Appl. No. 10/324,246.
Notice of Allowance dated Oct. 4, 2007 cited in U.S. Appl. No. 10/324,246.
Notice of Allowance dated Dec. 13, 2007 cited in U.S. Appl. No. 10/324,246.
Office Action dated Apr. 17, 2006 cited in U.S. Appl. No. 10/326,660.
Office Action dated Oct. 16, 2006 cited in U.S. Appl. No. 10/326,660.
Office Action dated Feb. 8, 2007 cited in U.S. Appl. No. 10/326,660.
Notice of Allowance dated Aug. 8, 2007 cited in U.S. Appl. No. 10/326,660.
Notice of Allowance dated Oct. 2, 2007 cited in U.S. Appl. No. 10/326,660.
Notice of Allowance dated Nov. 16, 2007 cited in U.S. Appl. No. 10/326,660.
Office Action dated Sep. 13, 2006 cited in U.S. Appl. No. 10/780,496.
Office Action dated Mar. 16, 2007 cited in U.S. Appl. No. 10/780,496.
Office Action dated Aug. 17, 2007 cited in U.S. Appl. No. 10/780,496.
Office Action dated Feb. 7, 2008 cited in U.S. Appl. No. 10/780,496.
Office Action dated Sep. 30, 2008 cited in U.S. Appl. No. 10/324,243.
Office Action dated Oct. 27, 2008 cited in U.S. Appl. No. 10/692,257.
Notice of Allowance dated Mar. 30, 2009 cited in U.S. Appl. No. 10/692,257.
Office Action dated Jun. 10, 2009 cited in U.S. Appl. No. 10/324,243.
Notice of Allowance dated Oct. 6, 2009 cited in U.S. Appl. No. 10/324,243.

* cited by examiner

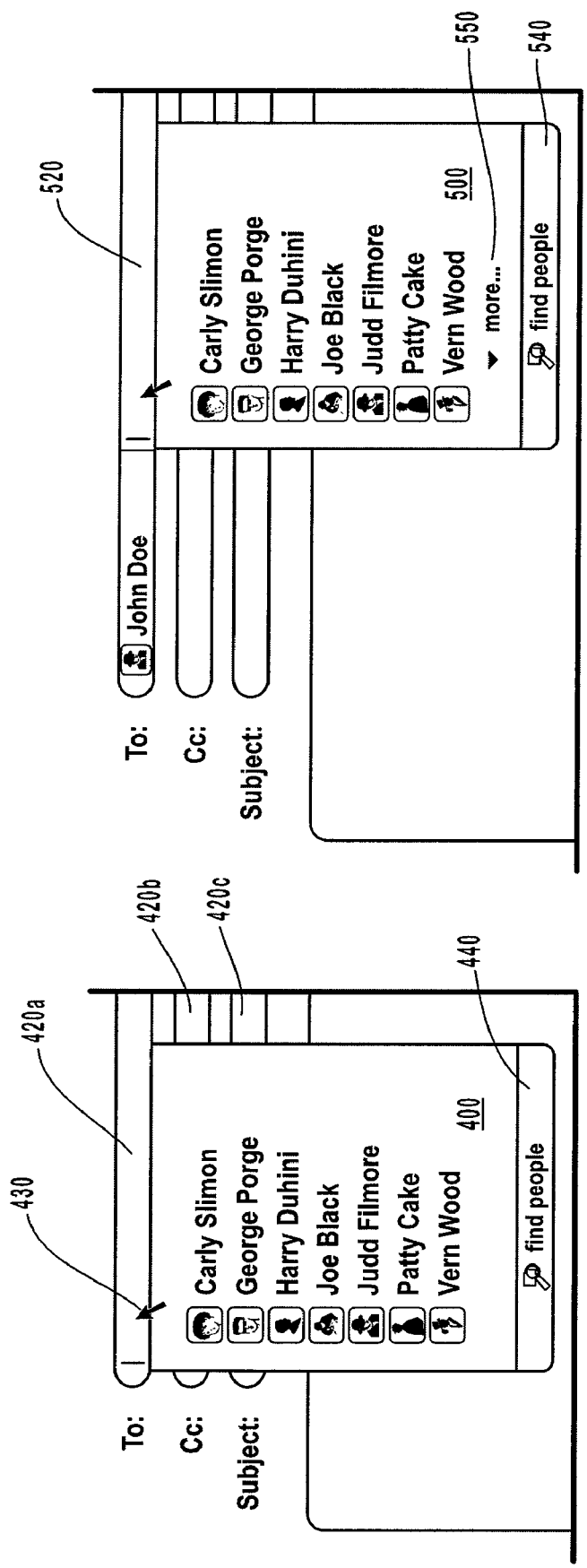

CONTACT PICKER INTERFACE

CROSS-REFERENCE TO RELATED APPLICATIONS

The present application is a continuation of U.S. application Ser. No. 10/845,464 filed May 13, 2004 and entitled "Contact Picker Interface", which is a continuation-in-part application of U.S. application Ser. No. 10/324,746 filed Dec. 19, 2002 and entitled "Contact Picker", U.S. Pat. No. 7,313, 760, issued Dec. 25, 2007. The foregoing patents and patent applications are incorporated herein by reference.

BACKGROUND OF THE INVENTION

1. The Field of the Invention

The present invention relates to user interface menus in computers and electronic devices and, more particularly, to methods, systems, and computer program products for obtaining and displaying desired contact information in computer applications.

2. Background and Relevant Art

The term "contact," as described herein, generally refers to any person, group, organization, business, household, or other type of identifiable entity. The term "contact information," as defined herein, generally refers to any information that corresponds to a contact and that may be considered relevant for identifying, contacting, accessing, corresponding or communicating with the contact. In the context of the present application, contact information is used by an application to perform a desired function, such as, for example, sending an email, initiating a telephone call, accessing a website, initiating a gaming session, performing a financial transaction, and so forth. Non-limiting examples of contact information include names, aliases, telephone numbers, email addresses, home addresses, instant messaging (IM) addresses, and web addresses. Contact information can also refer to other types of information such as the status of a contact. For example, information indicating a contact is currently online, or on a telephone line may also be broadly considered as contact information.

Many applications require contact information. Examples of some applications that require contact information include email applications, network gaming applications, instant messaging applications, telephone and telephony applications, Internet applications, financial applications, word processing applications, and business management applications.

Applications that require contact information typically provide interfaces and menus for entering the desired contact information within one or more "type-in" lines. "Type-in" lines generally comprise an input field configured to receive text characters that comprise the desired contact information. For example, an email interface will typically include type-in lines for receiving the email addresses of the intended email recipients. Contact information can normally be typed directly into the appropriate type-in lines, hence the name.

Some interfaces are also configured to automatically populate a type-in line with desired contact information, which is obtained from a directory corresponding to the particular application. For example, email applications typically include interface menus for looking up the email addresses of the contacts that are stored within the email contact directory. Likewise, a telephony application typically includes interface menus for looking up and accessing the telephone numbers of the contacts stored in the telephony contact directory. This search functionality provided by some interfaces is useful for helping to identify and select contact information that has either been forgotten or that is undesirably too long for manual entry.

Although existing interfaces for obtaining contact information are useful for their intended purposes, their utility is somewhat limited because they are specifically catered for a particular application. (e.g., Email search interfaces are configured to obtain email addresses, telephony search interfaces are configured to obtain telephone numbers, etc.) Furthermore, the vast array of different interfaces, each having its own unique characteristics, has complicated the task of learning how to utilize the interfaces to search for and obtain the desired contact information. Requiring each application to create a separate directory also reflects an inefficient expenditure of time and resources.

BRIEF SUMMARY OF THE INVENTION

The present invention is directed to improved methods, systems, and corresponding computer program products and interfaces for obtaining desired contact information.

According to one aspect of the invention, an interface displays a list of expected contacts that are most likely to be selected by a user whenever focus input is directed at a type-in line, or another input object, requiring contact information. Focus input may comprise a pointer hovering over the type-in line or any other input that would indicate a user wishes to populate the type-in line with contact information. Focus input can also be directed over an image or other object from which a contact picker dialog or interface can be generated to display a list of contacts for selection.

The list of contacts can be obtained from a single contact information directory associated with a particular application, as well as from a plurality of contact information directories that can be accessed by the interface and corresponding modules of the invention. As described herein, various criteria can be used to identify which contacts will be presented to the user and how they will be presented, as described herein.

When an expected contact is selected, the desired contact information that is appropriate for the current application and that corresponds to the expected contact is automatically entered into the type-in line and handed to the application programmatically. For example, the selection of an expected contact in an email application will automatically populate the type-in line with the appropriate email address or a 'friendly name' that comprises a link to the email address. It will be appreciated that the applications hosting the interface can specify the contact information that is required. The appropriate contact information is obtained from any number of directories that are searched by the user interface. The hosting applications can also specify required characteristics for a valid contact selection. For example, the hosting application can specify via an API to only show contacts having a predetermined combination of required characteristics or contacts from a particular directory. Some examples of code that can be implemented by such an API are provided below.

According to another aspect of the invention, if a user doesn't select one of the expected contacts, the user can begin typing desired contact information directly into the type-in line, thereby causing the interface to search through the one or more contact information directories for any unexpected contacts having contact information matching the input entered by the user. When only a single match is identified by the search, the type-in line is automatically populated with the remaining portion of the contact information that matches the user input. When a plurality of unexpected contacts are discovered that each have contact information matching the user input, they are displayed in a list for user selection. When the search fails to identify any matching contacts, the user interface displays additional options for searching for the desired contact information.

According to another aspect of the invention, a contact having multiple values associated with a desired property can be displayed different manner than contacts having only a single value associated with the desired property. For example, with reference to an email application, a contact having multiple available email address values can be displayed or highlighted in a different manner than contacts having only a single email address. The user can then select a highlighted contact, for example, to view all of the available options that can be selected for automatic entry into a type-in line.

According to yet another aspect of the invention, the interface displays a list of related contacts associated with a selected contact, thereby enabling a user to select any number of related contacts so that their contact information can also be automatically entered into the appropriate type-in line(s).

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4 illustrates one embodiment of a list that is provided by the interface of the invention and that contains expected contacts;

FIG. 5 illustrates one embodiment of a list that is provided by the interface of the invention and that contains related contacts;

DETAILED DESCRIPTION OF THE PREFERRED EMBODIMENTS

The present invention is directed to improved methods, systems, and corresponding computer program products and interfaces for obtaining and displaying desired contact information from one or more contact information directories. The embodiments of the present invention may comprise or be performed with a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Operating Environment

Figure 1:
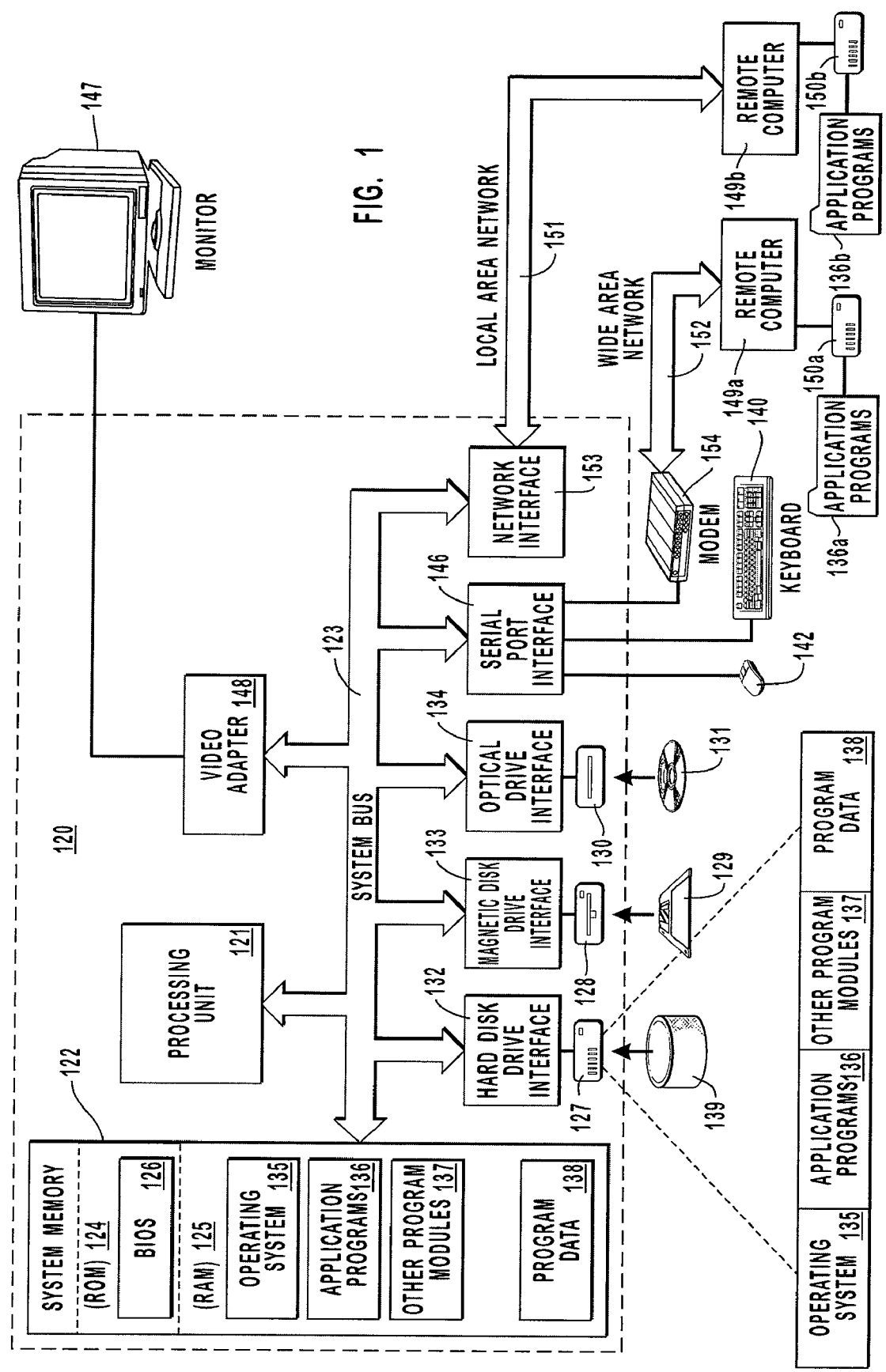
FIG. 1 illustrates one embodiment of an operating system that provides a suitable operating environment for the present invention.

FIG. 1 and the following discussion are intended to provide a brief, general description of a suitable computing environment in which the invention may be implemented. However, it should be emphasized that the present invention is not necessarily limited to any particular computerized system and may be practiced in a wide range of computerized systems including, but not limited to telephone and other communication devices, PDAs, information kiosks, and so forth.

Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing system in the form of a conventional computer 120, including a processing unit 121, a system memory 122 comprising computer readable media, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 20 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

Figure 2:
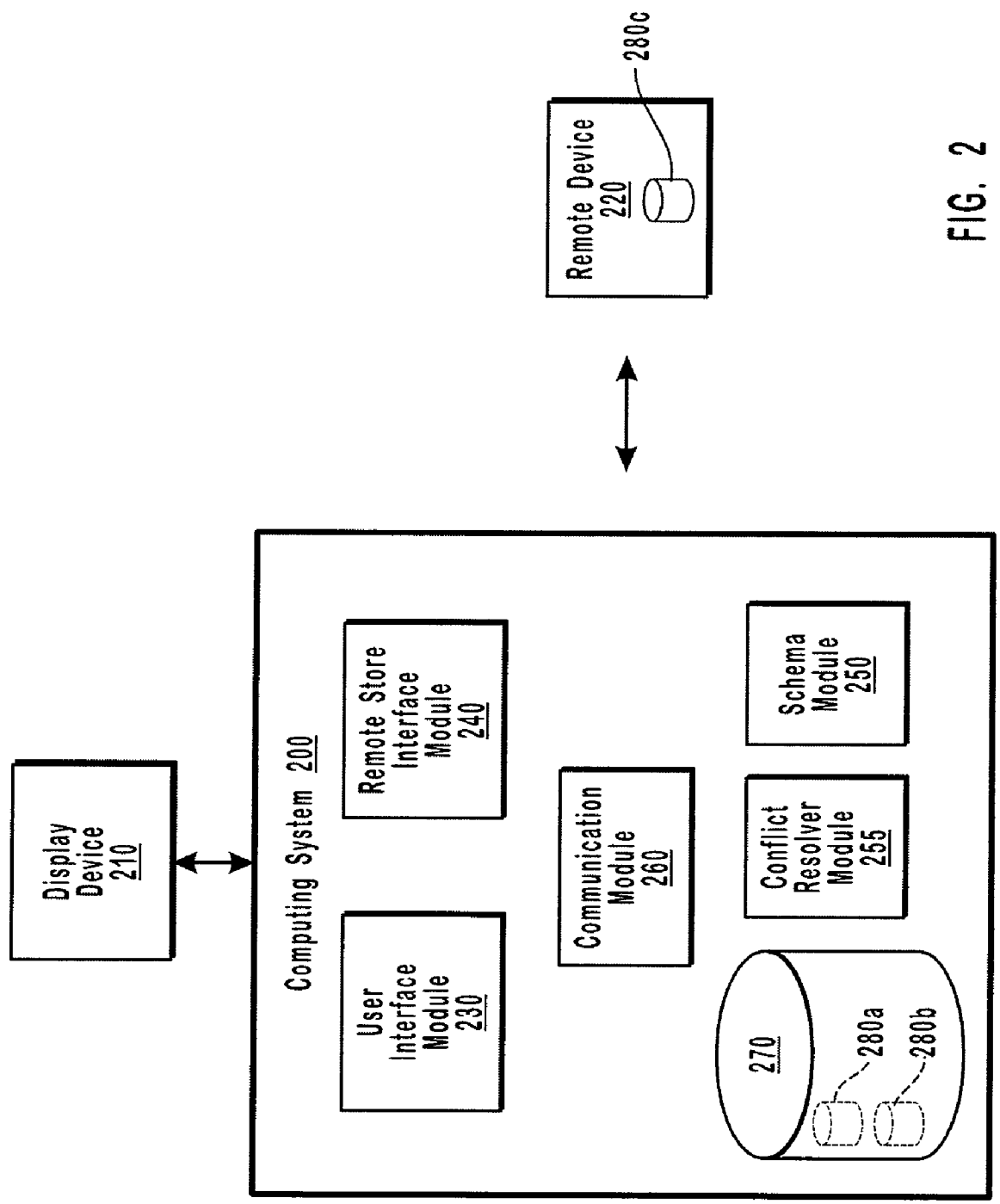
FIG. 2 illustrates one embodiment of a functional block diagram of various components of the invention.

FIG. 2 illustrates a functional block diagram of several components of the invention. As shown, a computing system 200 is connected with a display device 210 and a remote device 220. The connection link between each of these components may be a physical connection or a wireless connection. It will be appreciated that the display device 210 may be located remotely from the computing system 200 or integrally connected with the computing system 200. The display device 210 may comprise any screen, monitor, or other device that is configured to display images.

During use the computing system utilizes a user interface to display desired contact information at the display device. The functionality of the user interface to display desired contact information is enabled by various computer modules, such as user interface module 230, remote store interface module 240, schema module 250, conflict resolver module 255, and communication module 260, each of which will now be described.

The user interface module 230 includes sufficient computer executable instructions for operably displaying a user interface at the display device and for responding to user input entered at the user interface. The remote store interface module 240 includes sufficient computer executable instructions for searching and processing contact information stored at remote devices, such as remote device 220. Remote device 220 may be a remote computer, or server containing contact information.

The schema module 250 contains sufficient computer executable instructions for mapping contact information into categories and classifications that can be recognized by the user interface for display on the display device 210. The schema module 250 is useful for enabling contact information from remote stores to be organized according to a single unifying schema. The schema module 250 may also be used to map and identify contact information stored in local stores, such as storage media 270. The schema module 250 also correlates the properties of the contacts and their contact information (e.g., phone number, office number, group memberships, and so forth) for enabling sophisticated searching and querying of the contact information.

The conflict resolver module 255 includes sufficient computer executable instructions for comparing disparate contact information and for determining which of the contact information is most accurate and appropriate for a given application based on instructions received from the API of a given application. The resolver module 255 can also do 'fuzzy matching,' so as to identify similar data that is not exactly the same. For example, the resolver module 255 can enable matching of the names "John" and "Jon." This is useful for performing searches, as generally alluded to below. Conflict resolver module 255 also monitors and determines what contact information is most likely to be expected or used by a user, such as, for example, based on the past use of the contact information. Accordingly, the conflict resolver module 255 may utilize space on a storage medium, such as storage media 270 for tracking use of contact information.

The communication module 260 includes sufficient computer executable instructions for enabling communication between the various modules, as well as the display device 210, the remote device 220, and the storage media of the remote device 220 and computing system 200. In particular, the communication module enables the modules to access and process contact information that is stored in one or more contact information directories that may be stored locally and remotely.

The present embodiment illustrates three contact information directories, 280a, 280b, and 280c that correspond to different applications. For example, directory 280a may correspond to an email application and directory 280b may correspond to a telephony application. It will be appreciated that each directory 280a, 280b, and 280c will include information that is application specific (e.g., the email application directory 280a will have email addresses). The directories 280a, 280b, and 280c may also include additional information that is not application specific (e.g., the email application directory 280a may include the telephone numbers of certain contacts). It will be appreciated that the invention extends to embodiments utilizing and accessing any number of contact information directories.

Contact Picker Interface and Methods of Use

Figure 3:
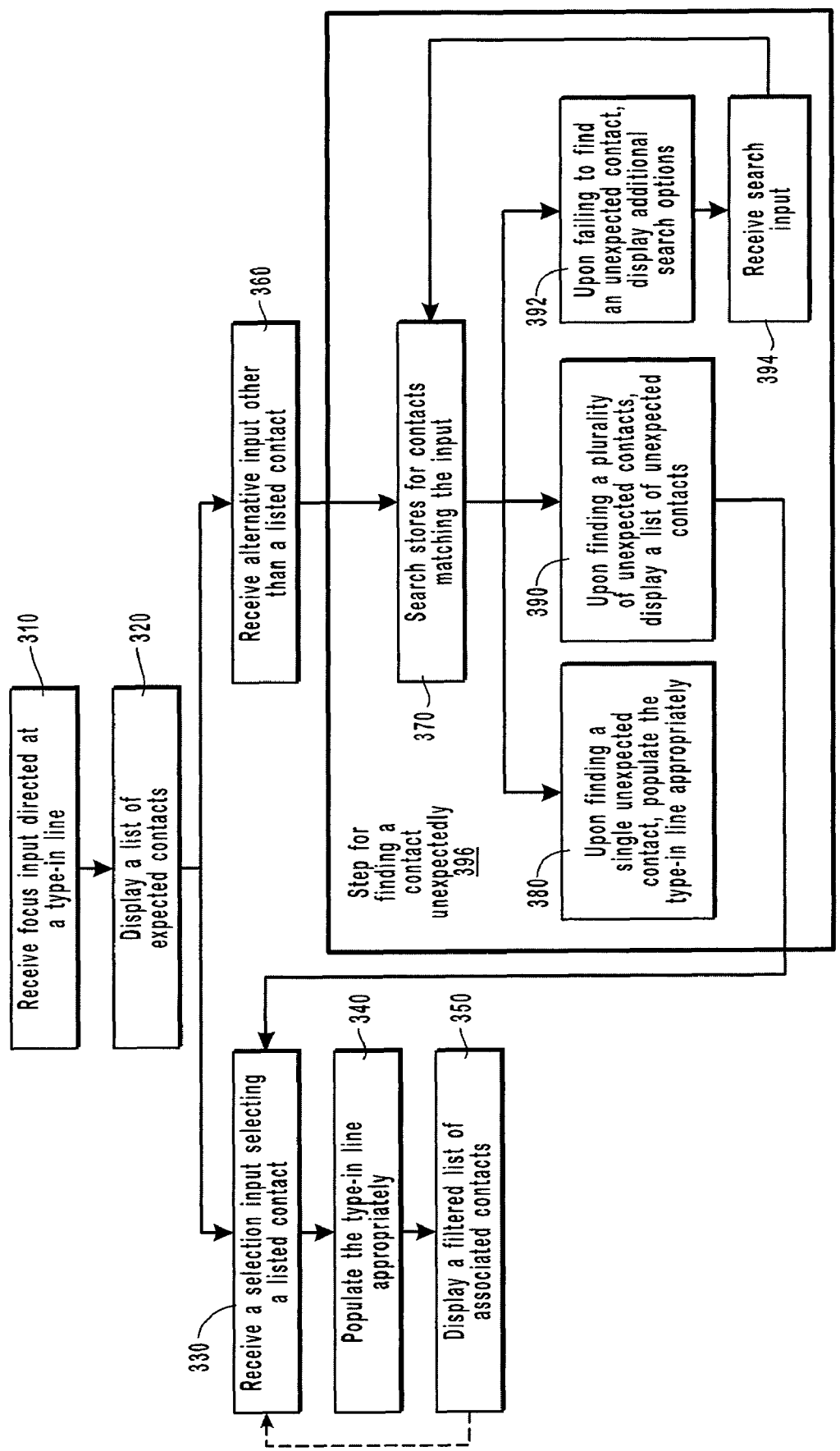
FIG. 3 is a flowchart illustrating certain acts of a method for displaying contact information according to the invention.

FIG. 3 illustrates a flowchart 300 of one method for intuitively displaying contact information at a display device from at least one contact information directory. As shown, the present embodiment includes various acts (acts 310, 320, 330, 340, 350, 360, 370, 380, 390, 392, and 394) and a step (step 396) for performing the method illustrated in FIG. 3. The acts and step of FIG. 3 will now be described with specific reference to FIGS. 4-8, which illustrate certain embodiments of the interface of the invention.

The first act of the illustrated method includes receiving a focus input directed at an input object, such as a type-in line, act 310. Focus input may include, for example, tabbing a prompt into the type-in line or hovering a pointer (e.g., a mouse pointer) over the type-in line. Upon receiving the focus input directed at the type-in line, the method includes an act of displaying a filtered list of expected contacts comprising a list of contacts that are most likely to be selected by a user. The determination as to what contacts are most likely to be selected by a user can be based on various criteria, including, but not limited to the frequency of selecting particular contacts, the last selected contacts, network or geographic proximity of the contact, compatibility of the contact's communication devices, and so forth. Any criteria used to identify the expected contacts can be resolved by the conflict resolver module 255, as mentioned above.

The criteria used to identify the expected contacts can also include an implicit aging property or attribute. For example, the criteria can be based on temporal information such as, but not limited to, the frequency of selection, the time of last selection, and so forth. In other words, a contact can become 'less likely to be selected by a user' the longer the associated contact has not been selected.

Other criteria can also be used to determine the likelihood a contact will be selected. For example, in a photo viewer application, one might be interested in associating a contact with the image of a person in a photo. Accordingly, for such an application, the likelihood of selection criterion can be based on non-textual characteristics or attributes, such as the facial characteristics identified by an image mapping program. In particular, likelihood of selection criterion can be based on facial similarities, such that the system can automatically suggest a contact whose facial characteristics are strongly correlated with a person in a photograph, for example.

To support such embodiments, it will be appreciated that the contact information directories described above can include repositories of image maps and other non-textual characteristics and attributes that can be accessed by the remote store interface module 240.

In other embodiments, the criteria used to determine the likelihood a contact will be selected can also be used to filter or organize the list of contacts that are displayed to the user in a particular order. For example, the displayed list of contacts can be organized by placing the contacts that have the highest likelihood of selection at the top of the list. It will be appreciated, however, that other structured orders and sequences for listing the contacts can also be used.

The displayed lists of contacts, as described herein, can also be controlled by the application hosting the contact picker interface. In particular, the applications hosting the interface can specify any number or combination of required characteristics a contact must possess in order to be listed by the contact picker. For example, the hosting application can specify via an API to only show contacts who are online, to only show contacts with phone numbers, to only show contacts who reside in a particular region, to only show contacts having particular software installed on their computing systems, or to only show contacts having a predetermined combination of required characteristics, including, but not limited to those listed above. In this manner, the contact picker can effectively filter the list of the displayed contacts.

FIG. 4 illustrates one embodiment of the list of expected contacts that is provided by the interface when focus input is directed at an input object, such as type-in line 420a. As shown, a mouse pointer is hovering over and directing focus input to type-in line 420a. The list 400 may disappear after the mouse pointer 430 is moved from type-in line 420a. When the mouse pointer is directed to type-in line 420b, the list 400 may reappear. However, when the mouse pointer is directed to type-in line 420c, the list 400 may not reappear if the type-in line 420c is not designated to receive contact information. Whether a type-in line is designated to receive contact information is determined by the specific application and communicated to the user interface through the modules described above in reference to FIG. 2. According to one embodiment, the expected contacts list 400 is displayed proximate to the type-in line 420a that is receiving focus input.

The list 400 of expected contacts may include any number of expected contacts and in any predefined order. According to one embodiment, the list of expected contacts includes a list of no more than seven contacts. The list of expected contacts can be arranged in alphabetical order, in order of most frequent use, in order of most common use, or any other predefined or random order. The displayed order of contacts can also be controlled entirely or in part on the likelihood of any selection criteria, as described above.

In some circumstances, one or more contacts identified in the list of expected contacts can correspond to multiple values for the same property. For example, a single contact can have different email addresses, including a work email address, a school email address, a personal email address, etc. In such circumstances, with no loss of generality, said contact can be displayed multiple times, once for each property value. Additionally or alternatively, the contact can also be highlighted or displayed in another distinct manner that indicates to the user that multiple values of the required property are present. The user can then view the multiple values by selecting the contact or by moving focus to the contact.

In one embodiment, for example, a user can click a mouse prompt over the contact object to view the various values associated with the contact and to select the desired contact information to be supplied to an application. It will be appreciated that when multiple values are associated with a single contact, the corresponding list of values associated with the contact can be arranged in any desired order, including, but not limited to an order based on the likelihood of selection as generally described above with reference to organizing the list of displayed contacts.

When one of the listed contacts is selected, such as with the click of a mouse pointer or with other selection input (act 330), the contact information corresponding to the selected contact, which is appropriate for the particular application, is inserted into the type-in line (act 340). What is considered "appropriate contact information" is generally application specific and corresponds to information that is required to perform a desired function with the application. For example, the appropriate contact information for an email application may include the email address of a contact that is necessary for sending an email message. The appropriate contact information may also be specified according to other criteria, such as by the directory from which the contact information is obtained, and so forth.

According to one embodiment, the applications specify what contact information is required by the applications. For example, if an application requires an email address then the application will specify to the user interface that the appropriate contact information comprises email addresses so that they can be obtained and displayed by the user interface accordingly. It will be appreciated, however, that the user interface can also be configured with security mechanisms to prevent the application from obtaining contact information that is not required by the application.

Although the previous example is provided with respect to email functionality, it will be appreciated that the scope of the invention extends to other embodiments in which the contact information is utilized by other application to enable different functionality. For example, other applications may utilize the contact information to initiate a telephony session, initiate a telephone call, initiate a network connection, initiate a gaming session, access a website, perform a financial transaction, send material goods via postal mail, and so forth.

It will also be appreciated that it is not necessary for the actual contact information utilized by the application to populate the type-in line. In particular, the type-in line may be populated with friendly names or other characters and objects that that link or point to the actual contact information utilized by the application. For example, in the email context, the type-in line may be filled with the contact's 'friendly name' linking to an email address, rather than the contact's actual email address.

FIG. 5 illustrates one embodiment in which a type-in line 520 has been populated with contact information, namely, the contact name of John Doe, one of the expected contacts listed in list 400 of FIG. 4. FIG. 5 also illustrates a related list 500 that identifies related contacts to the selected contact John Doe. This list 500 of related contacts is automatically provided, according to one embodiment, when a listed contact has been selected by the user, act 350.

The contacts listed in list 500 are associated with the selected contact by some relationship determined by the schema module and conflict resolver module of FIG. 2. An example of a relationship that may exist between a selected contact and the listed related contacts may include any association made previously between the selected contact and the one or more related contacts. For example, the fact that the selected contact was emailed at the same time as one of the related contacts may establish a suitable relationship. Relationships can also be established by virtue of having been mapped into the same classification or group by the schema module. For example, two contacts may be associated by belonging to the same group, family, business, organization, geographic location, and so forth. A suitable relationship may also be drawn from a previous association made between the contacts in the type-in line 520. (e.g., a previous email listing all of the related contacts.)

FIG. 5 also illustrates a "more" link 550 that may be selected to obtain a more extensive listing of related contacts or to launch additional user interfaces having searching, filtering, and querying functionality. It will also be appreciated that the "more" link 550 may be used with any list provided by the interface of the invention to obtain an expanded listing of contacts or to search for additional contacts.

If a user does not select one of the listed contacts, the user may begin typing or otherwise entering the desired contact information directly into the type-in line. Manually entered input is referred to herein as alternative input. Upon receiving alternative input, act 360, the method of the invention includes the step for finding one or more unexpected contacts containing the desired contact information, step 396. Step 396 can include any corresponding acts suitable for finding an unexpected contact. According to one embodiment, step 396 includes a combination of corresponding acts 370, 380, 390, 392, and 394.

The first corresponding act of step 396 includes searching stores for contacts matching the user input, act 370. This generally includes searching one or more contact information directories in one or more storage media for desired contact information that matches the alternative input entered by the user. The number of storage media (stores) that are searched and the order in which they are searched may be modified to accommodate any desired purpose. For example, it may be desired to first search a local store having a contact information directory that pertains to the current application prior to searching other stores, although this is not necessary.

Upon finding only a single unexpected contact that has desired contact information matching the alternative input, the method of FIG. 3 further includes the act of populating the type-in line with the remaining portion of the desired contact information, act 380. This is shown and described below in more detail with specific reference to FIG. 7.

Upon finding a plurality of unexpected contacts that each have contact information matching the alternative input, the method further includes the act of displaying an alternative list of at least some of the unexpected contacts, act 390. This is shown and described below in more detail with specific reference to FIG. 6.

Upon failing to find an unexpected contact having contact information matching the alternative input, the method further includes the act of displaying additional search options for obtaining the desired contact information, act 392. This is shown and described below in more detail with specific reference to FIG. 8.

Figure 6:
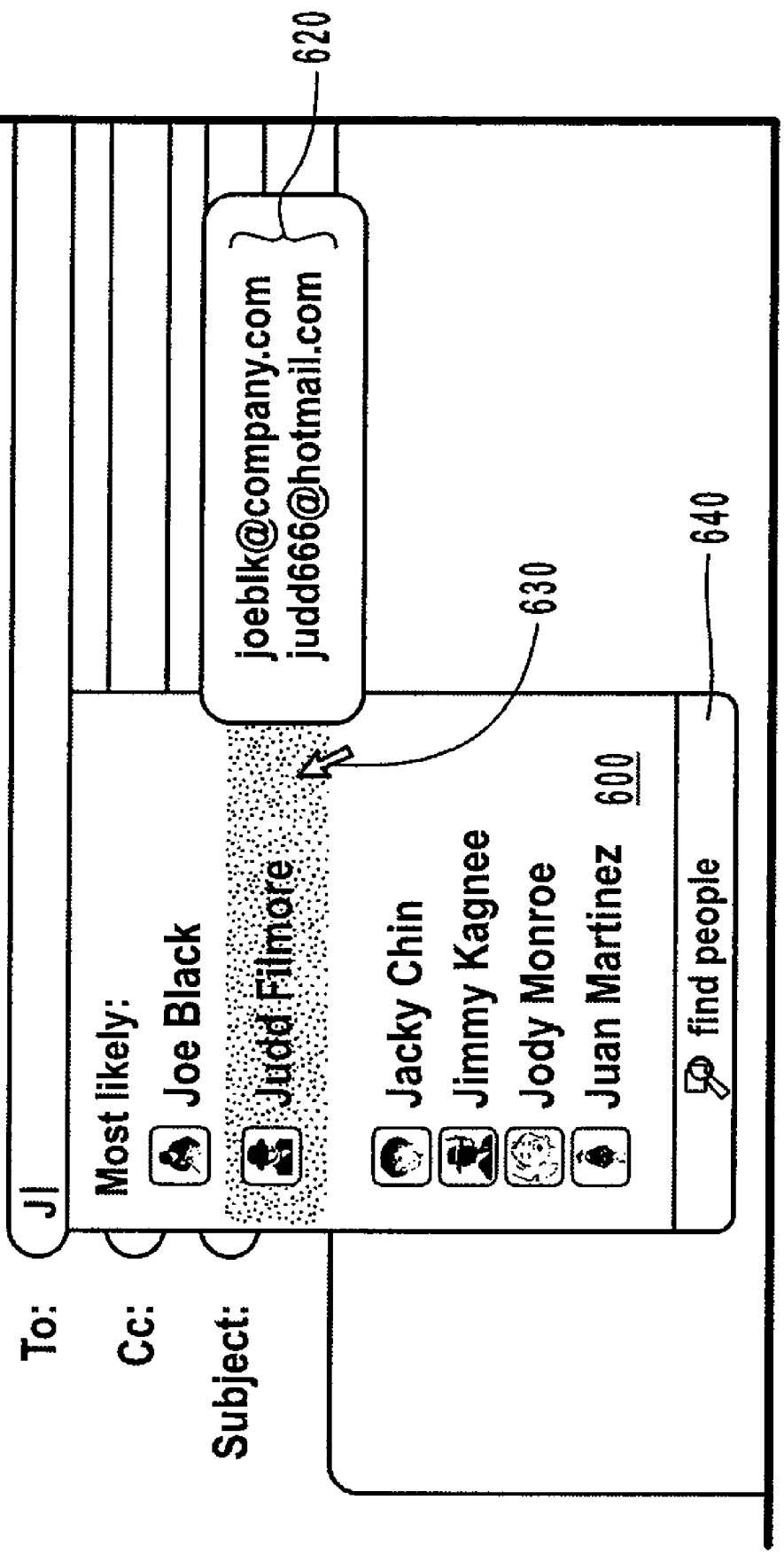
FIG. 6 illustrates one embodiment of a list that is provided by the interface of the invention and that contains expected contacts and that further includes a plurality of contact information options corresponding to a selected contact.

FIG. 6 illustrates a type-in line 620 that has received alternative input comprising the letter J. Having received this alternative input, the interface of the invention displays the alternative list 600 of most likely contacts, as shown. This list is generated from a search of one or more disparate contact information directories that may be located within one or more disparate storage media, as described above. In this present embodiment, each of the listed contacts has a name beginning with the letter J, matching the alternative input entered by the user. It will be appreciated, however, that the matching contact information does not need to include the characters of a name. For example, the matching contact information may comprise the characters or numbers of an address, a telephone number, or any other contact information. Contact information can also be matched based on user-added keywords (e.g. "college buddy"), that have been added by the user with another interface.

If one of the unexpected contacts is selected by the user, then the type-in line 620 is automatically populated with the appropriate and corresponding contact information of the selected contact. Alternatively, if the unexpected contact corresponds with more than one appropriate contact information option, then the plurality of contact information options can be displayed prior to populating the type-in line 620. For example, in the present embodiment, the contact Judd Filmore has two email addresses 660 that were discovered during the search. Therefore, both of the email addresses 660 are displayed for selection. Once an email address is selected, it populates the type-in line 620. Although this previous example has been given with reference to unexpected contacts, it will be appreciated that this functionality of displaying available contact information options also extends to expected contacts listed in list 400 of FIG. 4. The invention also extends to embodiments in which the available contact information options provide different types of contact information. For example, an application that enables both email and telephony functionality from a may simultaneously provide both email address information as well as telephone numbers for selection.

Figure 7:
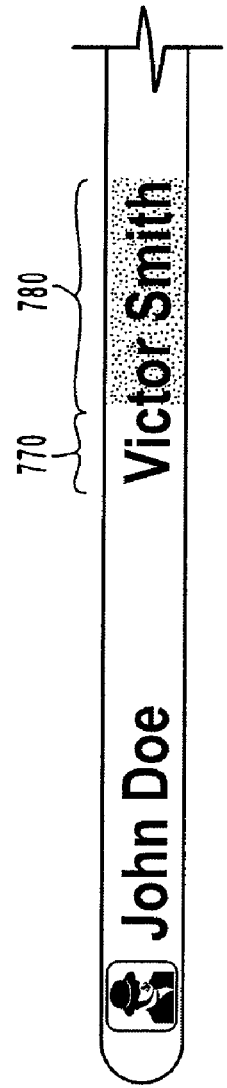
FIG. 7 illustrates one embodiment of a type-in line that is populated at least partially with a first contact name and a second contact name.

Attention is now directed to FIG. 7 to illustrate how the interface automatically populates the type-in line 720 with the remaining portion of the contact information that matches the portion of contact information entered by the user, act 380. In the present embodiment, two names are entered within the type-in line 720, namely, John Doe and Victor Smith. The first name was selected from list 400 of FIG. 4. Upon selecting John Doe from the list 400, table 500 appeared, as described above in reference to FIG. 5. However, list 500 disappeared when the user entered alternative input 770 comprising the letters "Vic". After entering the characters "Vic," the type-in line 720 is automatically populated with the remaining portion 780 of the desired contact information comprising the characters "tor Smith", which corresponds with and matches the alternative input 770 entered by the user. According, the combination of the remaining portion 780 and the alternative input 770, entered by the user, comprise the entirety of the desired contact information. In this example, the interface only populates the remaining portion of the type-in line 720 once it is determined that only a single contact has contact information matching the alternative input entered by the user. For example, this auto-complete function would not be performed after entering only the letters "v" or "vi" if there was another contact named Vivien who had the same two first letters as Victor, so that both matched the user input.

If no contact is discovered during the search having contact information matching the alternative input entered by the user, then the interface displays additional search options for finding the desired contact information. This act may be performed automatically, or only upon receiving a user request to access a menu containing the additional search options, act 393. For example, the buttons 440, 540, and 640 may be displayed in any of the lists 400, 500, and 600 to provide the user a means for providing the menu of additional search options.

Figure 8:
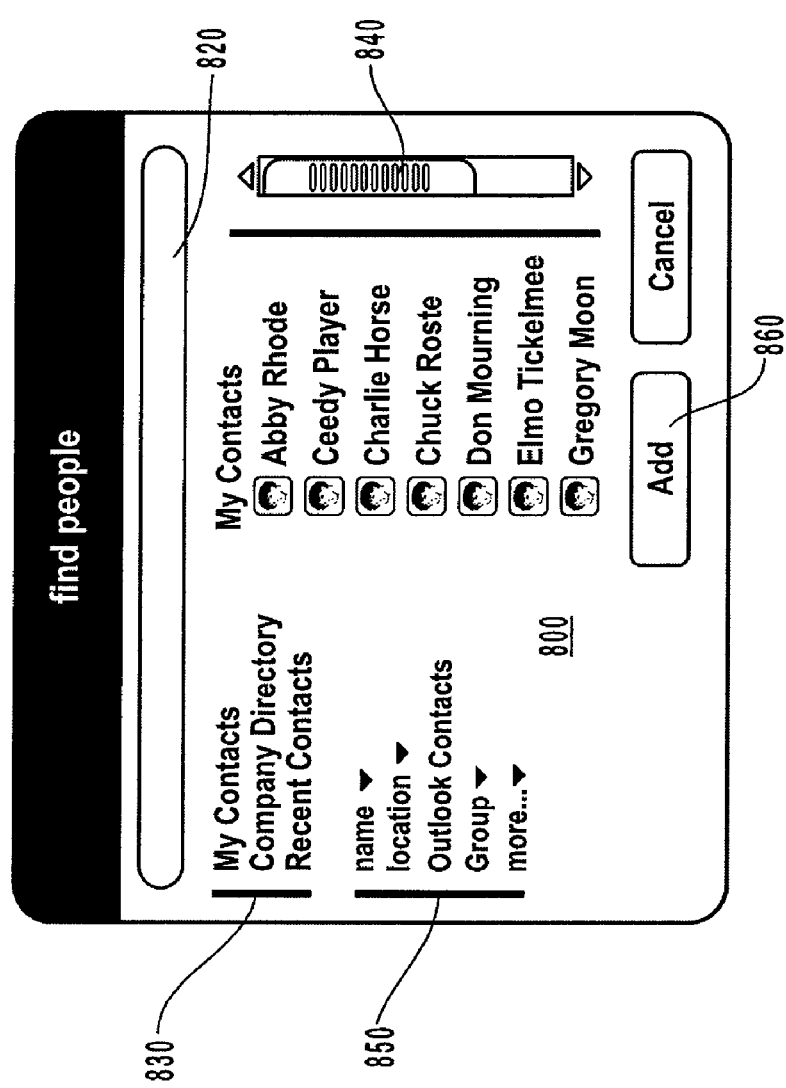
FIG. 8 illustrates one embodiment of a window that is provided by the interface of the invention and that contains additional search options for searching for desired contact information.

FIG. 8 illustrates one embodiment of a dialog 800 that may be utilized by the interface of the invention to display additional search options for searching for desired contact information. As shown, the dialog 800 includes a type-in line 820 that may be used to begin a query search, as described above. A list 830 of available contact information directories is also provided. This list 830 of available contact information directories may include any number and variety of contact information directories the user interface has access to. For example, in the present embodiment, the user interface has access to a "My Contacts" directory of personal contacts that is stored in the local storage medium 270 of the computing system 200 of FIG. 2, a "Company Directory" of corporate contacts stored on a server that the computing system 200 is connected to, and a "Recent Contacts" directory that is stored locally as a subdirectory of the "My Contacts" directory. Although by default, in a preferred embodiment, the search will include all available directories.

When a listed directory is selected, then the dialog 800 will display the contacts contained in that directory. For example, the dialog 800 is currently displaying the contacts of the My Contacts directory. To help scroll through the contacts, the dialog 800 may include a scrolling bar 840, as shown. It will be appreciated that such a scrolling bar may also be utilized with any of the other lists 400, 500, 600 described herein. The dialog 800 may also include type-down functionality within a given list, such that typing a few letters will automatically scroll the list to items beginning with the typed letters.

The dialog 800 also includes a list 850 of filters that can be used to obtain a list of contacts defined by a filter. The filters may apply to individual contact information directories or to a plurality of contact information directories. For example, the "name" filter may identify all available contacts by name from a single directory identified in list 830. Alternatively, the "name" filter may cumulatively identify all available contacts by name from every directory the interface has access to. Other non-limiting examples of filters that may be used with the interface include location filters that can be used to identify contacts associated by a geographic or network location and group filters that can be used to identify contacts associated by groups or organizations. Filters may also be customized to identify contacts from a particular application directory, such as contacts identified in an Outlook email application. Additionally, ISVs can add filters and/or directories to search for the desired contact.

If the user is unable to find a contact with any of the searching objects described, the user interface may present the user with an "Add" contact object 860 which will link the user to a menu for adding a new contact to a desired directory, such as the "My Contacts" directory. However, the interface and modules required for adding a new contact are not described herein.

Attention will now be directed to embodiments for creating and applying a contact picker dialog to a type-in line, or other desired object, such that it can be used to help a user select a desired contact.

In one embodiment, creating a Contact Picker Dialog is accomplished using the following code, using C#:

```
class MyEmailClientWindow: Window
{
    // Define a new Contact Picker Dialog and create it
    ContactPickerDialog picker = new ContactPickerDialog( );
    // Set title
    picker.Title = "Select Contacts to Email";
    // Set default picker view to Personal Contacts (which the user can change)
    picker.DefaultFolder = ContactPickerDialog.PersonalContacts;
    // Set label of picker OK button
    Picker.OkButtonLable = "Select Contacts";
    // Configure picker to select and return several contacts
    Picker.MultiSelect = true;
    // Create property request for the "To" contact well
    ContactPropertyRequest emailTo = new
        ContactPropertyRequest(ContactPropertyType.EmailAddress);
    // Set property request name, label, and detailed description
    emailTo.Label = "To";
    emailTo.DetailedDescription = "Click To button to add selected contact";
    // Add To property request to picker
    picker.PropertyRequests.Add(emailTo);
    // Repeat for property request for the "Cc" contact well
    ContactPropertyRequest emailCc = new
        ContactPropertyRequest(ContactPropertyType.EmailAddress);
    // Set property request name, label, and detailed description
    emailCc.Label = "Cc";
    emailCc.DetailedDescription = "Click Cc button to add selected contact";
    // Add To property request to picker
    picker.PropertyRequests.Add(emailCc);
}
```

Once the Contact Picker Dialog is created, the following code can be used display a contact picker dialog interface, which will display a list of contacts for user selection along with their contact information. In other words, it will be appreciated that in some embodiments, contact information can be displayed with the displayed list of contacts and prior to a selection being made of the corresponding contacts.

```
//Display picker and test result for OK button being selected
if (picker.ShowDialog( ) == DialogResult.OK)
{
    // Walk the collection of returned properties for the selected contacts
    foreach(SelectedContactProperty item in picker.SelectedProperties)
    {
        // Display email address of contact indicating basket it came from
        if (item.Label == "To")
        {
            Console.WriteLine("To request... " + item.Property.ToString( );
        }
        else
        {
            Console.WriteLine("Cc request... " + item.Property.ToString( );
        }
    }
}
```

The Contact Picker Dialog that will be created using the code in the previous examples allows the user to select multiple contacts to be batched together in multiple requests. It will be appreciated, however, that there are simpler forms of the Contact Picker Dialog control that can also restrict the number of contacts or properties that can be returned. For example, the following code snippet creates a Contact Picker Dialog that allows the user to select only one contact, and returns that contact's display name and telephone number to the appropriate application:

```
class MyEmailClientWindow: Window
{
    // Define a new Contact Picker Dialog and create it
    ContactPickerDialog picker = new ContactPickerDialog( );
    // Set title
    picker.Title = "Pick a Contact";
    // Set default picker view to Personal Contacts (which the user can change)
    picker.DefaultFolder = ContactPickerDialog.PersonalContacts;
    // Set label of picker OK button
    Picker.OkButtonLable = "Select Contact";
    // Configure picker to select and return several contacts
    Picker.MultiSelect = false; // <- change from previous example
    // Create property request for the display name
    ContactPropertyRequest displayNameRequest = new
        ContactPropertyRequest(ContactPropertyType.DisplayName);
    // Add property request to picker
    picker.PropertyRequests.Add(displayNameRequest);
    // Create property request for the telephone number
    ContactPropertyRequest telephoneRequest = new
        ContactPropertyRequest(ContactPropertyType.TelephoneNumber);
    // Add To property request to picker
    picker.PropertyRequests.Add(telephoneRequest);
}
//Display picker and test result for OK button being selected
if (picker.ShowDialog( ) == DialogResult.OK)
{
    // Since we know only one contact has been selected, we can access the
    // returned properties directly
    SelectedContactProperty item;
    // Display display name of selected contact
    item = picker.SelectedProperties[0];
    Console.WriteLine("Display Name... " + item.Property.ToString( );
    // Display phone number of selected contact
    item = picker.SelectedProperties[1];
    Console.WriteLine("Phone Number... " + item.Property.ToString( );
}
```

From the perspective of an application programming interface developed for obtaining contact information according to the invention, a function call or request is generated for a contact picker dialog or interface by an application in response to a user input directing focus to an object, such as a type-in line that is displayed by the application. The API then utilizes appropriate computer-executable instructions, such as the code shown above, to generate the contact picker dialog. During the generation of the contact picker dialog, appropriate contact repositories can also be queried by the API to identify a list of contacts that are likely to be selected by the user, as described above, along with the corresponding contact information to be displayed by the dialog.

The identified contacts are then displayed with or without the contact information which will be utilized by the application. Upon receiving a user selection of a displayed contact, the API then passes the correspondingly appropriate contact information on to the application. The correspondingly appropriate contact information is the contact information that will be used by the application to perform a desired function (e.g., initiate a call, send an email, etc), as specified by the application.

In embodiments where the contact information is not displayed with the contact, the selection of a contact prompts the API to identify and display the contact information related to the selected contact. Thereafter, contact information that is selected by the user is passed on to the application.

It will be appreciated, however, that the foregoing examples of the API and code corresponding to the contact picker dialog are merely illustrative and should not, therefore be construed as limiting the scope of the invention. To the contrary, various different types of code can be implemented by programming interfaces to enable the methods of the invention, for obtaining, displaying and providing desired contact information.

Furthermore, although many of the examples provided herein are directed to email interface applications, the invention also extends to other applications, including, but not limited to telephony and telephone applications, network gaming applications, financial applications, time management applications, information kiosk applications, internet applications, word processing applications, facsimile and telecopy applications, design applications, image and photo applications, and so forth. Furthermore, even though many of the embodiments shown and described above illustrate interfaces displaying only a limited number of contacts and contact information, it will be appreciated that the interfaces may be modified to display any desired number of contacts and any variety of corresponding contact information.

It will also be appreciated that although many of the embodiments described above relate to providing a listing of contacts by name, the list of contacts may also include rich contact objects (e.g., images) that can be used to ascertain information about the listed contacts. By way of example, and not limitation, each listed contact may be displayed with a corresponding rich tile image that displays certain attributes and that links to other information.

In summary, the present invention provides methods, systems, and computer program products including user interfaces or dialogs, for obtaining and displaying contact information. The interfaces of the invention can be used in various applications to search for and display contact information from a variety of disparate contact information directories. Although many examples are provided with respect to providing contact information when focus input is directed at a type-in line that the scope of the invention extends to embodiments in which focus input is directed to other input objects, such as fields, cells, images, and so forth.

The described embodiments are, therefore, to be considered in all respects only as illustrative and not restrictive. In particular, the present invention may be embodied in other specific forms without departing from its spirit or essential characteristics. Accordingly, the scope of the invention is indicated by the appended claims rather than by the foregoing description. All changes which come within the meaning and range of equivalency of the claims are to be embraced within their scope.

What is claimed is:

1. In a computing system that is connected with a display device and that includes a user interface that is configured to display contact information at the display device, a method for an API providing contact information obtained from at least one contact information directory to an application, the method comprising:

a contact picker API receiving an API function call request from an associated application for a contact picker interface to be generated, wherein the request is generated by the associated application in response to the associated application detecting focus input directed at a type-in line of an application interface that is displayed at a display device, the type-in line of the application interface being configured to receive desired contact information for enabling a desired function to be performed by the associated application with the desired contact information;

in response to the request, the contact picker API generating the contact picker interface;

during the generation of the contact picker interface, the contact picker API querying one or more contact information directories for expected contacts and displaying a list of the expected contacts at the contact picker interface based at least in part on a likelihood of selection criteria, each of the listed expected contacts being obtained from at least one contact information directory;

the contact picker API receiving user input selecting one of the expected contacts displayed by the contact picker interface within the list of expected contacts;

the contact picker API receiving from the associated application, a specification of desired contact information that corresponds with the selected one of the expected contacts and that is required by the application; and the contact picker API handing off the desired contact information to the associated application, wherein the desired contact information is used to populate one or more fields of the associated application and which is usable by the associated application to perform the desired function.

2. The method recited in claim 1, wherein the desired function is sending an email and wherein the desired contact information is an email address.

3. The method recited in claim 1, wherein the desired function is initiating a telephone call and wherein the desired contact information is a telephone number.

4. The method recited in claim 1, wherein the focus input comprises a mouse prompt hovering over the type-in line.

5. The method recited in claim 1, wherein the focus input comprises input tabbing a mouse prompt into the type-in line.

6. The method recited in claim 1, wherein the method further includes displaying information within the type-in line that is different than the desired contact information that is used by the associated application to perform the desired function.

7. The method recited in claim 1, wherein the desired contact information links to additional contact information used by the associated application to perform the desired function.

8. The method recited in claim 1, wherein the desired contact information is obtained by searching a plurality of databases.

9. The method recited in claim 8, wherein one of the plurality of databases is a database associated with the associated application.

10. The method recited in claim 1, wherein the method further includes providing the contact picker interface with security mechanisms that are configured to prevent the associated application from obtaining contact information that is not required by the application.

11. A computer program product comprising one or more computer program storage media storing computer-executable instructions configured to implement a method for an API providing contact information obtained from at least one contact information directory to an application, the method comprising:

a contact picker API receiving an API function call request from an associated application for a contact picker interface to be generated, wherein the request is generated by the associated application in response to the associated application detecting focus input directed at a type-in line of an application interface that is displayed at a display device, the type-in line of the application interface being configured to receive desired contact information for enabling a desired function to be performed by the associated application with the desired contact information;

in response to the request, the contact picker API generating the contact picker interface;

during the generation of the contact picker interface, the contact picker API querying one or more contact information directories for expected contacts and displaying a list of the expected contacts at the contact picker interface based at least in part on a likelihood of selection criteria, each of the listed expected contacts being obtained from at least one contact information directory;

the contact picker API receiving user input selecting one of the expected contacts displayed by the contact picker interface within the list of expected contacts;

the contact picker API receiving from the associated application, a specification of desired contact information that corresponds with the selected one of the expected contacts and that is required by the application; and the contact picker API handing off the desired contact information to the associated application, wherein the desired contact information is used to populate one or more fields of the associated application and which is usable by the associated application to perform the desired function.

12. A computer program product comprising one or more computer program storage media storing computer-executable instructions that, when executed by a processor, are configured to implement a method for obtaining and displaying contact information, wherein the method includes:

detecting focus input directed at a type-in line that is displayed at a display device of a computing system, the type-in line being configured to receive desired contact information for enabling a desired function to be performed with the contact information, wherein the focus input comprises at least one of tabbing a prompt into the type-in line or hovering a pointer over the type-in line;

automatically in response to detecting the tabbing of the prompt into the type-in line or the hovering of the pointer over the type-in line, and prior to receiving any input typed into the type-in line, obtaining and displaying a list of expected contacts based on a likelihood of selection criteria, each of the listed expected contacts being obtained from the at least one contact information directory; and wherein the listed contacts are displayed with two visually distinct groupings of contacts, including a first grouping of contacts and a second grouping of contacts, and wherein the grouping of contacts determined to contain contacts that are the most likely to be selected contacts is displayed above the second grouping of contacts.

13. A computer program product comprising one or more computer program storage media storing computer-executable instructions that, when executed by a processor, are configured to implement a method for obtaining and displaying contact information, wherein the method includes:

detecting focus input directed at a type-in line that is displayed at a display device of a computing system, the type-in line being configured to receive desired contact information for enabling a desired function to be performed with the contact information, wherein the focus input comprises at least one of tabbing a prompt into the type-in line or hovering a pointer over the type-in line;

automatically in response to detecting the tabbing of the prompt into the type-in line or the hovering of the pointer over the type-in line, and prior to receiving any input typed into the type-in line, obtaining and displaying a list of expected contacts based on a likelihood of selection criteria, each of the listed expected contacts being obtained from the at least one contact information directory; and wherein the list of expected contacts comprises a first list of expected contacts and wherein the method further comprises an act of automatically displaying a second list in response to receiving input selecting a first selected contact from the first list of expected contacts and wherein the second list comprises a plurality of contact information associated with the first selected contact and that is displayed with the first list.

14. The computer program product recited in claim 13, wherein the plurality of contact information associated with the first selected contact includes a plurality of contact information values that are displayed in a sorted order based on likelihood of selection.

15. A computing system having a processor and one or more storage medium storing computer-executable instructions that, when executed by the processor, are configured to implement a method for an API providing contact information obtained from at least one contact information directory to an application, the method comprising:

a contact picker API receiving an API function call request from an associated application for a contact picker interface to be generated, wherein the request is generated by the associated application in response to the associated application detecting focus input directed at a type-in line of an application interface that is displayed at a display device, the type-in line of the application interface being configured to receive desired contact information for enabling a desired function to be performed by the associated application with the desired contact information;

in response to the request, the contact picker API generating the contact picker interface;

during the generation of the contact picker interface, the contact picker API querying one or more contact information directories for expected contacts and displaying a list of the expected contacts at the contact picker interface based at least in part on a likelihood of selection criteria, each of the listed expected contacts being obtained from at least one contact information directory;

the contact picker API receiving user input selecting one of the expected contacts displayed by the contact picker interface within the list of expected contacts;

the contact picker API receiving from the associated application, a specification of desired contact information that corresponds with the selected one of the expected contacts and that is required by the application; and the contact picker API handing off the desired contact information to the associated application, wherein the desired contact information is used to populate one or more fields of the associated application and which is usable by the associated application to perform the desired function.

16. A computing system having a processor and one or more storage medium storing computer-executable instructions that, when executed by the processor, are configured to implement a method for obtaining and displaying contact information, wherein the method includes:

detecting focus input directed at a type-in line that is displayed at a display device of a computing system, the type-in line being configured to receive desired contact information for enabling a desired function to be performed with the contact information, wherein the focus input comprises at least one of tabbing a prompt into the type-in line or hovering a pointer over the type-in line;

automatically in response to detecting the tabbing of the prompt into the type-in line or the hovering of the pointer over the type-in line, and prior to receiving any input typed into the type-in line, obtaining and displaying a list of expected contacts based on a likelihood of selection criteria, each of the listed expected contacts being obtained from the at least one contact information directory; and wherein the listed contacts are displayed with two visually distinct groupings of contacts, including a first grouping of contacts and a second grouping of contacts, and wherein the grouping of contacts determined to contain contacts that are the most likely to be selected contacts is displayed above the second grouping of contacts.

17. A computing system having a processor and one or more storage medium storing computer-executable instructions that, when executed by the processor, are configured to implement a method for obtaining and displaying contact information, wherein the method includes:

detecting focus input directed at a type-in line that is displayed at a display device of a computing system, the type-in line being configured to receive desired contact information for enabling a desired function to be performed with the contact information, wherein the focus input comprises at least one of tabbing a prompt into the type-in line or hovering a pointer over the type-in line;

automatically in response to detecting the tabbing of the prompt into the type-in line or the hovering of the pointer over the type-in line, and prior to receiving any input typed into the type-in line, obtaining and displaying a list of expected contacts based on a likelihood of selection criteria, each of the listed expected contacts being obtained from the at least one contact information directory; and wherein the list of expected contacts comprises a first list of expected contacts and wherein the method further comprises an act of automatically displaying a second list in response to receiving input selecting a first selected contact from the first list of expected contacts and wherein the second list comprises a plurality of contact information associated with the first selected contact and that is displayed with the first list.

* * * * *